US012786685B2

(12) United States Patent
Gajic et al.

(10) Patent No.: US 12,786,685 B2
(45) Date of Patent: Nov. 3, 2026

(54) METHOD AND APPARATUS FOR DETERMINING AND UTILIZING A TRUST INDICATION IN MOBILE NETWORKS

(71) Applicant: Nokia Technologies Oy, Espoo (FI)

(72) Inventors: Borislava Gajic, Unterhaching (DE); German Peinado Gomez, Warsaw (PL); Saurabh Khare, Bangalore (IN); Tejas Subramanya, Munich (DE)

(73) Assignee: Nokia Technologies Oy, Espoo (FI)

( * ) Notice: Subject to any disclaimer, the term of this patent is extended or adjusted under 35 U.S.C. 154(b) by 557 days.

(21) Appl. No.: 18/337,279

(22) Filed: Jun. 19, 2023

(65) Prior Publication Data

US 2023/0413029 A1 Dec. 21, 2023

(30) Foreign Application Priority Data

Jun. 20, 2022 (IN) ............................. 202241035292

(51) Int. Cl.
*H04W 8/08* (2009.01)
*H04W 12/084* (2021.01)
*H04W 12/121* (2021.01)

(52) U.S. Cl.
CPC ........... *H04W 8/08* (2013.01); *H04W 12/084* (2021.01); *H04W 12/121* (2021.01)

(58) Field of Classification Search
CPC ............. H04W 12/084; H04W 12/121; H04W 12/122; H04W 12/66; H04W 12/67; H04W 48/18; H04W 8/08; H04W 8/12
See application file for complete search history.

(56) References Cited

U.S. PATENT DOCUMENTS

| | | | | |
|---|---|---|---|---|
| 11,188,785 | B2 * | 11/2021 | Lee | G06F 18/2113 |
| 11,363,481 | B1 * | 6/2022 | Feder | H04W 24/02 |
| 2022/0046101 | A1 * | 2/2022 | Zhang | H04L 41/142 |
| 2022/0060388 | A1 * | 2/2022 | Li | H04L 41/0816 |
| 2022/0394473 | A1 * | 12/2022 | Lehtovirta | H04W 8/06 |
| 2023/0080836 | A1 * | 3/2023 | Vahidi Mazinani | H04W 60/06 455/435.1 |
| 2024/0129199 | A1 * | 4/2024 | Wang | H04L 41/14 |

FOREIGN PATENT DOCUMENTS

WO 2021/096410 A1 5/2021

OTHER PUBLICATIONS

Extended European Search Report received for corresponding European Patent Application No. 23178572.6, Nov. 14, 2023, 9 pages.

(Continued)

*Primary Examiner* — Liton Miah
(74) *Attorney, Agent, or Firm* — Barta Jones, PLLC

(57) ABSTRACT

Methods and apparatus are disclosed for. A method comprises, collecting information on messages exchanged between a first mobile network and a second mobile network during a time period; and determining a trust indication of the first mobile network at least based on the collected information. The trust indication of the first mobile network indicates a level of trustworthiness of the first mobile network.

10 Claims, 7 Drawing Sheets

(56) References Cited

OTHER PUBLICATIONS

"3rd Generation Partnership Project; Technical Specification Group Services and System Aspects; Study of Enablers for Network Automation for 5G 5G System (5GS); Phase 3 (Release 18)", 3GPP TR 23.700-81, V0.3.0, May 2022, pp. 1-192.
"KI#3, New Sol: < Data or analytics exchange in roaming scenario>", SA WG2 Meeting #151e, S2-2205089, vivo, May 16-20, 2022, 7 pages.
"Discussion on the User Controlled PLMN Selector with Access Technology in CP-SOR procedures", 3GPP TSG-CT WG1 Meeting #133-e, C1-216771, Agenda: 5GProtoc17, vivo, Nov. 11-19, 2021, 2 pages.
"Network Functions Virtualisation (NFV); FV Security; Security and Trust Guidance", ETSI GS NFV-SEC 003, V1.1.1, Dec. 2014, pp. 1-57.
"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V17.0.0, Dec. 2021, pp. 1-51.
"Study on Zero Trust Security", 3GPP TSG-SA3 Meeting #107-e, S3-221172, Agenda Item: 6, Lenovo, May 16-20, 2022, 3 pages.
Rose et al., "Zero Trust Architecture", NIST Special Publication 800-207, Aug. 2020, 59 pages.
"3rd Generation Partnership Project; Technical Specification Group Services and System Aspects; Security architecture and procedures for 5G system (Release 17)", 3GPP TS 33.501, V17.5.0, Mar. 2022, pp. 1-293.
"Zero trust and 5G—Realizing zero trust in networks", Ericsson, Retrieved on Jul. 24, 2023, Webpage available at : https://www.ericsson.com/en/reports-and-papers/ericsson-technology-review/articles/zero-trust-and-5g.
"3rd Generation Partnership Project; Technical Specification Group Services and System Aspects; Architecture enhancements for 5G System (5GS) to support network data analytics services (Release 17)", 3GPP TS 23.288, V17.5.0, Jun. 2022, pp. 1-207.
"3rd Generation Partnership Project; Technical Specification Group Services and System Aspects; Management and orchestration; Management Data Analytics (MDA) (Release 17)", 3GPP TS 28.104, V17.0.1, Jun. 2022, pp. 1-82.
"3rd Generation Partnership Project; Technical Specification Group Services and System Aspects; System architecture for the 5G System (5GS); Stage 2 (Release 17)" 3GPP TS 23.501, V17.5.0, Jun. 2022, pp. 1-568.
"3rd Generation Partnership Project; Technical Specification Group Core Network and Terminals; Non-Access-Stratum (NAS) functions related to Mobile Station (MS) in idle mode (Release 17)", 3GPP TS 23.122, V17.6.0, Mar. 2022, pp. 1-129.
"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.
"Key issue on determining and maintaining trust indication in 5G Core", 3GPP TSG-SA3 Meeting #107-e Ad Hoc, S3-22xxxx, Nokia, Jun. 27-Jul. 1, 2022, 2 pages.

* cited by examiner

100

METHOD AND APPARATUS FOR DETERMINING AND UTILIZING A TRUST INDICATION IN MOBILE NETWORKS

TECHNICAL FIELD

Embodiments of the disclosure generally relate to wireless communication, and more particularly, to methods and apparatus for determining and utilizing a trust indication in mobile networks.

BACKGROUND

Currently, a security and trust guidance for network functions (NFs) adheres with principles of zero trust design, by emphasizing that compliance and state measurements must be continuously monitored in order to evaluate a level of trust of an NF.

The trust is defined as confidence in the integrity of an entity for reliance on that entity to fulfil specific responsibilities. The trust is considered to be dynamic, thus it is expressed in assurance levels based on specific measures that identify when and how a relationship or transaction can be relied upon. Trust measures may include different assurance elements that include an identity, an attribution, an attestation, and non-repudiation, for example. Some of parameters for trust evaluation in network function virtualization (NFV) include a geographical location, a jurisdiction/regulatory location (public/private), a logical (network) location, hardware/software capabilities, provenance and history, a chain of trust, security of a network, appropriate use of encryption techniques, etc.

For example, network data analytics function (NWDAF) may detect an abnormal behavior for a particular NF instance (for example excessive resource usage). An operation, administration and management (OAM) or an application function (AF) may subscribe/request to the NWDAF to notify/respond its analytics output when such abnormal behavior occurs. There can be different causes of the abnormal behavior, such as an erroneous operation at a NF, an attack at a particular NF by a malicious entity in a system, etc. In order to analyze a root cause of the abnormal behavior, more information can be collected from different entities in the system (such as, OAM, network repository function (NRF) and NFs). In addition, security related data can also be collected by a NWDAF from the NFs (or via an OAM). The analytics output is indicated to the OAM or the AF for performing corresponding trust measures.

Now, some studies are made to make an analysis of the existing 5G system to identify additional opportunities to apply the principles of zero trust security. However, the current 5G system does not support a continuous or on-demand dynamic mechanism to evaluate the trustworthiness of involved communication points (e.g., network functions), which a key principle of zero trust security.

SUMMARY

This summary is provided to introduce simplified concepts of determining and utilizing a trust indication in mobile networks. This summary is not intended to identify key features or essential features of the claimed subject matter, nor is it intended to be used to limit the scope of the claimed subject matter.

According to a first aspect of the disclosure, there is provided a first apparatus. The first apparatus comprises at least one processor, and at least one memory storing computer program code, wherein when executed on the one or more processors, the computer program codes cause the first apparatus to collect information on messages exchanged between a first mobile network and a second mobile network during a time period; and determine a trust indication of the first mobile network at least based on the collected information. The trust indication of the first mobile network indicates a level of trustworthiness of the first mobile network.

According to a second aspect of the disclosure, there is provided a second apparatus. The second apparatus comprises at least one processor, and at least one memory storing computer program code, wherein when executed on the one or more processors, the computer program codes cause the second apparatus to obtain a trust indication of a first mobile network, which indicates a level of trustworthiness of the first mobile network; and configure a roaming operation related to the first mobile network based on the trust indication.

According to a third aspect of the disclosure, there is provided a third apparatus. The third apparatus comprises at least one processor, and at least one memory storing computer program code, wherein when executed on the one or more processors, the computer program codes cause the third apparatus to obtain a trust indication of a first mobile network, which indicates a level of trustworthiness of the first mobile network; and utilize the trust indication for a network operation related to at least one network function entity of the first mobile network. In some embodiments, the utilization of the trust indication may comprise filtering or blocking traffics coming from the at least one network function entity, in a case that the trust indication indicates a lower level of trustworthiness of the first mobile network.

According to a fourth aspect of the disclosure, there is provided a fourth apparatus. The fourth apparatus comprises at least one processor, and at least one memory storing computer program code, wherein when executed on the one or more processors, the computer program codes cause the third apparatus to obtain a trust indication of a first network function entity in a second mobile network, wherein the trust indication indicates a level of trustworthiness of the first network function; and utilize the trust indication for a network operation related to the first network function entity. The utilization of the trust indication may comprise any of the following: decommissioning the first network function entity, in a case that the trust indication indicates a lower level of trustworthiness of the first network function entity; configuring or updating a profile of the first network function entity for a network function discovery, based on the trust indication; and selecting the first network function entity as a lower layer federated learning aggregator based on the trust indication.

According to a fifth aspect of the disclosure, there is provided a method. The method comprises: collecting information on messages exchanged between a first mobile network and a second mobile network during a time period; and determining a trust indication of the first mobile network at least based on the collected information. The trust indication of the first mobile network indicates a level of trustworthiness of the first mobile network.

According to a sixth aspect of the disclosure, there is provided a method. The method comprises: obtaining a trust indication of a first mobile network, which indicates a level of trustworthiness of the first mobile network; and configuring a roaming operation related to the first mobile network based on the trust indication.

According to a seventh aspect of the present disclosure, provided a method. The method comprises: obtaining a trust indication of a first mobile network, which indicates a level of trustworthiness of the first mobile network; and utilizing the trust indication for a network operation related to at least one network function entity of the first mobile network.

According to an eighth aspect of the present disclosure, provided a method. The method comprises: obtaining a trust indication of a first network function entity in a second mobile network, wherein the trust indication indicates a level of trustworthiness of the first network function; and utilize the trust indication for a network operation related to the first network function entity.

According to a ninth aspect of the present disclosure, it is provided a computer readable storage medium, on which instructions are stored, when executed by at least one processor, the instructions cause the at least one processor to perform any method according to the fifth, sixth, seventh and eighth aspect.

According to a tenth aspect of the present disclosure, it is provided computer program product comprising instructions which when executed by at least one processor, cause the at least one processor to perform any method according to the fifth, sixth, seventh, and eighth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings in which.

DETAILED DESCRIPTION

Figure 1:
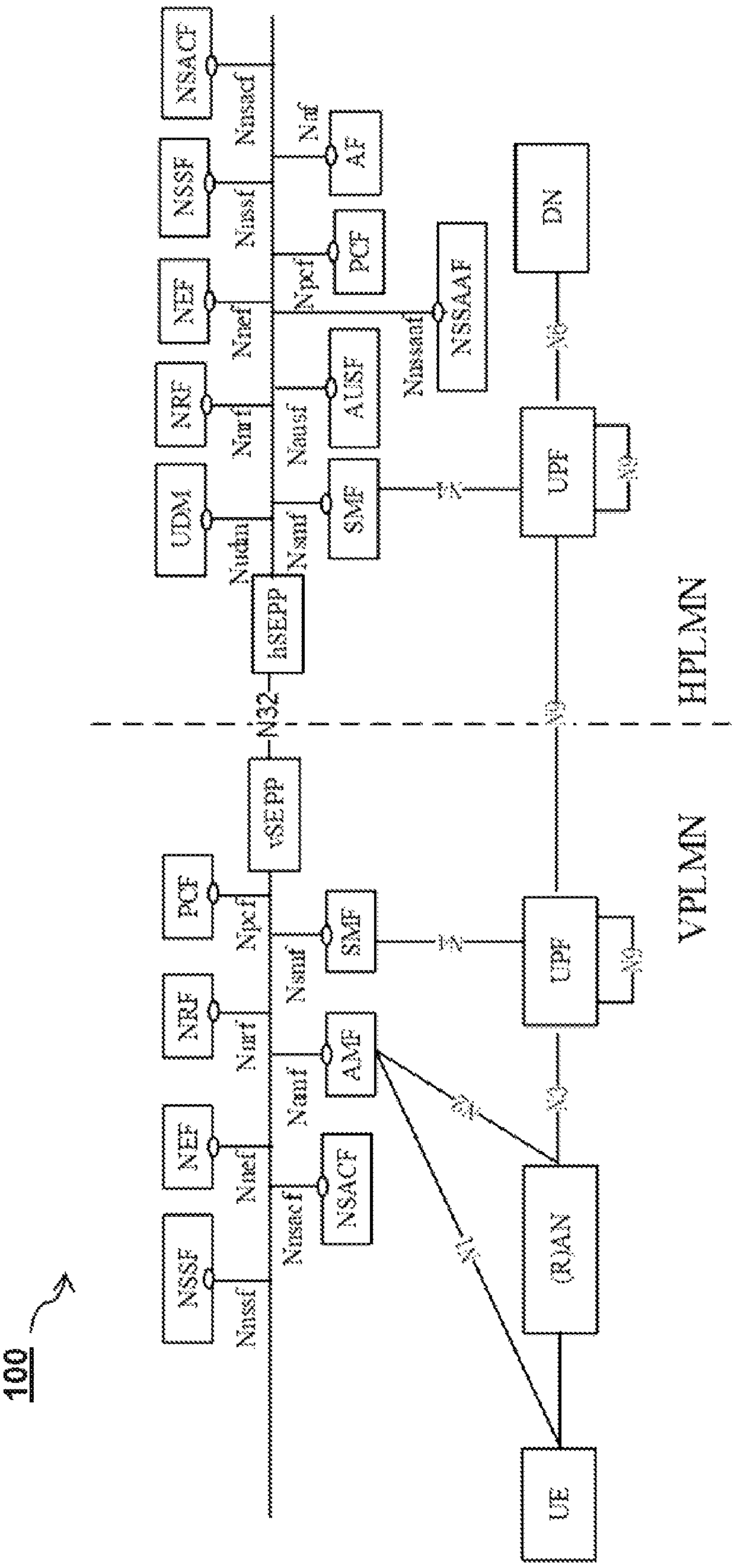
FIG. 1 illustrates an exemplary network architecture of a system in which embodiments of the present disclosure can be implemented.

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout.

In the following description and claims, unless defined otherwise, all technical and scientific terms used herein have the same meaning as commonly understood by one of ordinary skills in the art to which this disclosure belongs.

References in the present disclosure to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit for a mobile device or a similar integrated circuit in server, a cellular network device, or other computing or network device.

As used herein, the term "mobile network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in one or more mobile networks may be performed according to any suitable generation communication protocols, including, but not limited to, the fifth generation (5G), the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As mentioned above, the current 5G system does not support a continuous or on-demand dynamic mechanism to evaluate the trustworthiness of involved communication points (e.g., network functions), which a key principle of zero trust security. Multiple parameters can be taken into consideration for evaluating trust that is relevant for telecom networks. For example, parameters for evaluation a level of trust of a particular NF instance (e.g., a NF instance) may comprise a geographical location, NF location, software capabilities (such as patch level, software versions), execution history of an instance, configuration compliance (compliance with security policies), and an appropriate use of encryption techniques, and other parameters related to the particular NF instance.

A trust score associated to a NF instance may be provided as a metric of trustworthiness of the NF. The trust score is a scalar value indicating the trust measure of the NF instance. Each NF may have different trust scores based on their parameters for trust evaluation, such as their NF current configured state, image version and compliance level. In an example, the trust scores may have three different ranges on a scale of 0-100: low confidence (<50), medium confidence (51-79) and high confidence (>=80). Based on a trust score evaluation at a certain point in time, a trust score is provided to the NF. If the score falls below a certain threshold, further actions should be taken, such as terminating the NF and replacing it.

However, the above trust score is based on static parameters, and does not consider a dynamic evaluation of a security posture and trustworthiness of the NFs, taking into account variables, such as abnormal behaviors, statistical data and/or risk predictions.

Current solutions on detection of anomalous NF behavior (e.g., by NWDAF) provide only information on instantaneous issue with the NF. The NWDAF (or equivalent analytics entity) provides a notification when it detects an abnormal behavior for a particular NF instance (for example, excessive resource usage or consistent failure to provide its service). However, there is no indication on the level of broader and/or "longer term" trust, i.e., whether the NF (or Management Function) may be considered as trustable or not based on statistics and predictions regarding its potential abnormal behavior, as well as on security and risk considerations.

Furthermore, currently there are no means for maintaining such trust indication and utilizing it in the most efficient way.

There are multiple use cases where a trust score of NF (or MnF), or an indication of trust of a set of NFs (or MnFs), is needed within a single operator network as well as across multiple operators' networks. In an example, trust scores/indications of visited PLMNs (VPLMNs) are based on messages exchanged between a home PLMN (HPLMN) and VPLMNs (e.g., NFs or MnFs belonging to the VPLMN). For example, the following factors may be taken into account by the HPLMN when building the trust score/indications per VPLMN (roaming/interconnection peer): risk per message (i.e., a message with privacy information (e.g., IMSI, location) or charging information may represent a high risk); messages and/or sequences of messages being part of an attack (e.g., Denial of Service (DoS), interception) or fraud; confidence in analytics data exchanged between operators; logs from signaling firewalls; etc.

Trust indicators of NPNs (including standalone non-public networks (SNPNs) and public network integrated NPNs (PNI-NPNs) closed access groups (CAGs)) are utilized for access to NPN services via a PLMN (and vice versa). In the case of SNPN, a credentials holder controlled prioritized list of preferred SNPNs could be dynamically and continuously updated based on the trust indicators for SNPNs. Similarly, in the case of PNI-NPN, an allowed CAGs list, i.e., a list of CAGs that a UE is entitled to access, can be re-configured based on the trust indicators of the CAGs, by using a UE configuration update procedure for access and mobility management related parameters. This continuous evaluation of the security posture is a key tenet of the Zero Trust security framework.

Another prominent use case is that the network may certainly benefit from the continuous monitoring of the trust score/indication of the VPLMNs or NPNs, by using this trust score/indication to prioritize or deprioritize configuration of a PLMN list or NPN list, modifying accordingly the service level agreements and/or adopting dynamically security measures to cope with the risk introduced by lowering the trust score/indication. For example, if an operator-A in country-A has established an agreement with each of 3 operators in country-B (denoted as VPLMN-B1, VPLMN-B2, VPLMN-B3), then based on different roaming and billing aspects, operator-A can configure a UE with a priority list of country-B VPLMNs. Thus, when UE lands in country B, based on the priority list, a certain VPLMN is selected by the UE. Currently, this information is provisioned in the UE via the SoR (Steering or Roaming) procedure, e.g., as defined in the TS 33.501 (in clause 6.14). However, currently, the continuous evaluation of the security posture and trust of the NF(s) (or MnF(s)) of the VPLMN(s) are not considered by the operator A to prioritize the connectivity through a particular VPLMN (e.g., the most 'trusted' one).

The present disclosure proposes solutions of determining, maintaining and utilizing a trust indication in mobile networks. The trust indication indicates a level of trustworthiness of a communication point in mobile networks in a more generic longer-term. That is, it is not specific to a single abnormal behavior occurrence, but to all abnormal events that have occurred in the past over a considered variable time period and expected (predicted) in the future.

In some embodiments, the trust indication may comprise a trust score, which is represented for example by a scalar value within a certain range (e.g., 1-100), defined by a trust metric of the communication point. For example, higher values may refer to more trustable communication point. In some embodiments, the trust score may be a qualitative metric, e.g., low trust, medium trust, high trust.

In some embodiments, the trust indication may optionally contain further information, e.g.:

- a validity period—a time period in which the estimated trust score is valid;
- a considered time period—information on a time window in which relevant data (based on which the trust score is determined) for trust estimation has been collected;
- fluctuation information—information on fluctuation (e.g., the changes and trends) in the trust score over the considered time period;
- a list of one or more communication points having a same trust score.

In some embodiments, the communication point may be any of a NF, a MnF, a public land mobile network (PLMN), or a non-public network (NPN). Their trust indications may be classified into three kinds: NF level trust, PLMN level trust, and NPN level trust. For the NF level trust, a trust indication indicates a level of trustworthiness of a NF, a set of NFs (including one or more NFs), or a MnF. For the PLMN level trust, a trust indication indicates a level of trustworthiness of a PLMN, or a set of PLMNs (including one or more PLMNs). For the NPN level trust, a trust indication indicates a level of trustworthiness of a SNPN, a set of SNPNs (including one or more SNPNs), or a CAG of PNI-NPN.

The present disclosure proposes several deployment approaches for hosting a proposed means for determining a trust indication envisioned in this present disclosure.

- Option 1: a network analytics function e.g., network data analytics function (NWDAF) or management data analytics function (MDAF) may be extended with a new capability to provide a new analytics type related to a derivation of the trust indication envisioned in the present disclosure.
- Option 2: a separate network security entity may be introduced to be responsible for a derivation of a trust indication. This security entity may rely on NWDAF/MDAF analytics capability to provide a new analytics type related to the trust indication along with additional information on a confidence of its analytics outcomes.
- Option 3: a means/functionality for determining a trust indication may be hosted in any network function. For example, for a derivation of a trust score of PLMN level trust or NPN level, the means/functionality can be hosted in a security edge protection proxy (SEPP); for a derivation of a trust score of NF level trust, the means/functionality can be hosted in a unified data management (UDM) or a policy control function (PCF), etc.

The present disclosure proposes new analytics types to determine a trust indication per NF/MnF, per PLMN, or per NPN. A trust score may be calculated individually per NF/MnF and/or be aggregated per PLMN (e.g., per visited PLMN (VPLMN)) or NPN, via artificial intelligence, machine learning, or other new analytics mechanisms. For example, a NWDAF may keep of collecting data/information related to a particular PLMN (e.g., denoted as PLMN1), such as how many call failures, call drops, errors, attack or abnormal events received from the PLMN1, and accordingly, provide the trust score of the PLMN1 based on the collected data/information.

According to embodiments of the present disclosure, in order to provide analytics outcomes, input data and/or information needed for trust estimation is collected from various network entities, e.g., NFs, OAM systems, a SEPP. In some embodiments, for PLMN level trust or NPN level trust, relevant data/information may be collected from a SEPP on message exchanges between NFs belonging to different PLMNs or NPNs, on NPNs services, and/or on different key performance indicators (KPIs) associated with failures at different levels in a PLMN or NPN, etc. For example, KPIs are available as defined in 3GPP SA5 specifications.

Then, a proposed means as mentioned above can determine a trust indication at least based on the collected data and/or information. The following descriptions are provided by taking the deployment option 1 as an example. However, it can be appreciated that the solutions may be also applied for the other two deployment options.

As mentioned above, the collected data and/or information are related to a communication point (whose trust indication is to be estimated) in the past. In the deployment option 1, the NWDAF/MDAF may analyze the "exceptions" related to the communication point (e.g., NF, MnF, PLMN, or NPN) in the past. As used herein, the "exceptions" refers to abnormal events occurred during a considered variable time period in the past. The trust indication may be determined further based on information on the exceptions. For example, the "exceptions" information may include an exception category, an exception level, a frequency of exceptions happened during a considered period of time in the past.

Then, the trust indication for the communication point can be determined and output. In this regard, the NWDAF/MDAF may returns information of trust indications per NF/MnF/PLMN/NPN, possibly supplemented by additional information, e.g., a list of NF/MnF/PLMN/NPN exhibiting the same level of trust, information on NFs interacting with the NF under evaluation with associated trusted levels, etc.

Table 1 shows an example of output information of the new trust related analytics for a given target NF (i.e., the NF under evaluation). Similarly, this information can be requested and provided for other communication points (e.g., NF sets, MnF(s) PLMNs, NPNs,)

TABLE 1

Example output information for trust indication of NFs. Similar output is possible for NF sets, MnF(s), PLMNs and NPNs (Standalone Non-Public Networks (SNPNs), or Public Network Integrated NPNs (PNI-NPNs) Closed Access Groups (CAGs))

| Information | Description |
|---|---|
| NF trust indication (1, . . . , max) | Information on trust related indications for a given target NF. It may be indexed (e.g., with an index number 1, . . . , max) to correspond to a NF. |
| Trust score | Scalar value indicating the trust metric of the target NF |
| Considered time period | Time window in which behaviors of the target NF have been monitored and based on which the output is derived |

TABLE 1-continued

Example output information for trust indication of NFs. Similar output is possible for NF sets, MnF(s), PLMNs and NPNs (Standalone Non-Public Networks (SNPNs), or Public Network Integrated NPNs (PNI-NPNs) Closed Access Groups (CAGs))

| Information | Description |
|---|---|
| Validity period | Time period in which the estimated trust score is valid |
| Fluctuation info | Information on the changes/trends in the trust score over considered time period. This information may capture the sudden drops in the trust score (e.g., due to single high-risk event which impacts the NF trust immediately) as well as the existence of longer low risk events which gradually decrease the trust score. |
| List of NF(s) with the same trust score | One or more NFs exhibiting the same trust score |

For example, there may be a list of NF trust indications, each of which has an index number (e.g., 1, . . . , or max) corresponding to respective NFs. The index number "max" would determine a maximum number of items (i.e., NFs in this example) for which the trust indication is determined. Here is an example of a trust indication for a target entity: for a NF, e.g., AMF-1, the NF trust indication (e.g., indexed with trust indicator 3) contains the following information (trust score=5, considered time period=from . . . to . . . , etc,).

In some embodiments, a trust indication of a public network integrated NPN (PNI-NPN) closed access group (CAG) may be evaluated. Data originated from NFs and KPIs of the NFs providing services to the group of UEs belonging to particular CAG can be collected. The trust indication of CAG can be evaluated in a similar way as the evaluation of a trust indication of the PLMN. The information to be used to evaluate the trust of a particular CAG would come from an evaluation of the NFs providing services to the group of UEs belonging to that CAG. In this case the trust indication/score of one NF could affect several PNI-NPN if that is shared among them.

The present disclosure proposes several solutions for utilizing the trust indication envisioned in this disclosure in an efficient way.

In some embodiments, a unified data management (UDM) or a steering of roaming (SoR) application function (AF) may use a PLMN level trust to prioritize or de-prioritize a PLMN list for a UE. UDM or SoR may use a NPN level trust to prioritize or de-prioritize a NPN list for a UE. For example, the UDM and SoR may obtain the trust scores of PLMNs or NPNs in the list from the means for determining the trust scores, e.g., NWDAF, SEPP. Alternatively, the UDM and SoR may obtain the trust scores of PLMNs or NPNs in the list from a database, e.g., analytics data repository function (ADRF), network repository function (NRF), or other network functions, e.g., OAM. Details of this use case are described later with reference to FIG. 4.

In some embodiments, a network repository function (NRF) can use a trust indication of a NF and/or a trust indication of a PLMN/NPN to which a NF belongs, to increase or decrease a priority of a discovery response for the NF. In an example, the NRF may query an ADRF regarding the related trust indication or receive the related trust indications from an OAM, and update the NF profile based on the related trust indications. Details of this use case are described later with reference to FIG. 3.

In some embodiments, a SEPP may use a trust indication of a mobile network to apply additional filtering or policy on less trusted networks. For example, a SEPP may determine whether a trust score of a PLMN/SNPN is lower than a threshold. When the trust score of a PLMN/SNPN is lower than the threshold, the PLMN/SNPN can be determined as a less trusted network. Then, SEPP can provide additional filtering on traffic coming to and/or from the PLMN/SNPN. Details of this use case are described later with reference to FIG. 3.

In some embodiments, OAM systems may use a trust indication of a NF or MnF and/or a trust indication of a PLMN/NPN to which a NF belongs, for management of the NF or MnF. In an example, if a trust score of a NF falls under a certain minimum threshold, the OAM may decide to decommission the NF. In another example, if a trust score of a PLMN falls under a certain minimum threshold, the OAM may decide to decommission at least part of NFs and/or MnFs belonging to the PLMN. Details of this use case are described later with reference to FIG. 3.

In some embodiments, information of trust indication may be used in Federated Learning (FL). In FL, for each (or several) iteration(s) of the training process, the FL Aggregator selects NFs (or MnFs) as distributed nodes allowing them to participate in the training process. Furthermore, in case of Hierarchical Federated learning, the root FL Aggregator selects NFs or MnFs as lower layer FL Aggregators which further selects other NFs or MnFs as distributed nodes. Currently, the selection of NFs (or MnFs) is either random or based on various criteria, such as computational resource availability in the NFs (or MnFs), data availability in the NFs or MnFs, etc., which may have direct impact on the trained FL model performance (e.g., accuracy). Since the (root) FL Aggregator does not consider the trust score/indications of a NF (or a MnF) when selecting it in the training process, it may result in a compromised and degraded FL model performance due to direct or indirect attacks by the malicious/untrusted NF (or MnF) participating in the training process. In some embodiments of the present disclosure, a FL aggregator (e.g., NWDAF) can use a trust indication of a NF (or MnF) and/or a trust indication of a PLMN/NPN to which a NF (or a MnF) belongs, to select or unselect the NF (or MnFs) in the training process. In an example, a NF (or a MnF) with a higher trust score (e.g., higher than a threshold) may be selected as a lower layer FL Aggregator. In another example, a NF (or MnF) belonging to a PLMN/NPN which has a higher trust score, may be selected as a lower layer FL Aggregator. Accordingly, the FL model performance may be upgraded.

In some embodiments, a unified data management (UDM) may use a trust indication of a PNI-NPN CAG, to enable or disable the CAG. The UDM may change subscription data of a user equipment (UE) to include or exclude an identifier (e.g., ID) of the CAG based on the trust indication of the CAG. This may trigger an update of UE configurations. Details of this use case are described later with reference to FIG. 4.

With these embodiments, information of the trust indication can be utilized in the most efficient way, e.g., react to an anomaly detection or in general to a security risk coming from a NF (or MnF) or a set of those based their trust indications, and enforcing adequate (security) policies to manage the risk in case that a trust indication indicates that a trust of a network entity or mobile network is lowering and degrading.

FIG. 1 illustrates exemplary network architecture of a system in which embodiments of the present disclosure can be implemented. The network architecture may be implemented as an architecture for a 5G system, e.g., as described in 3GPP TS 23.501. The 5G architecture is defined as service-based, and the interaction between network functions is represented in two ways: a service-based representation (where network functions within a control plane enables other authorized network functions to access their services) and a reference point representation (showing the interaction between the NF services in the network functions described by point-to-point reference point between any two network functions).

Figure 4:
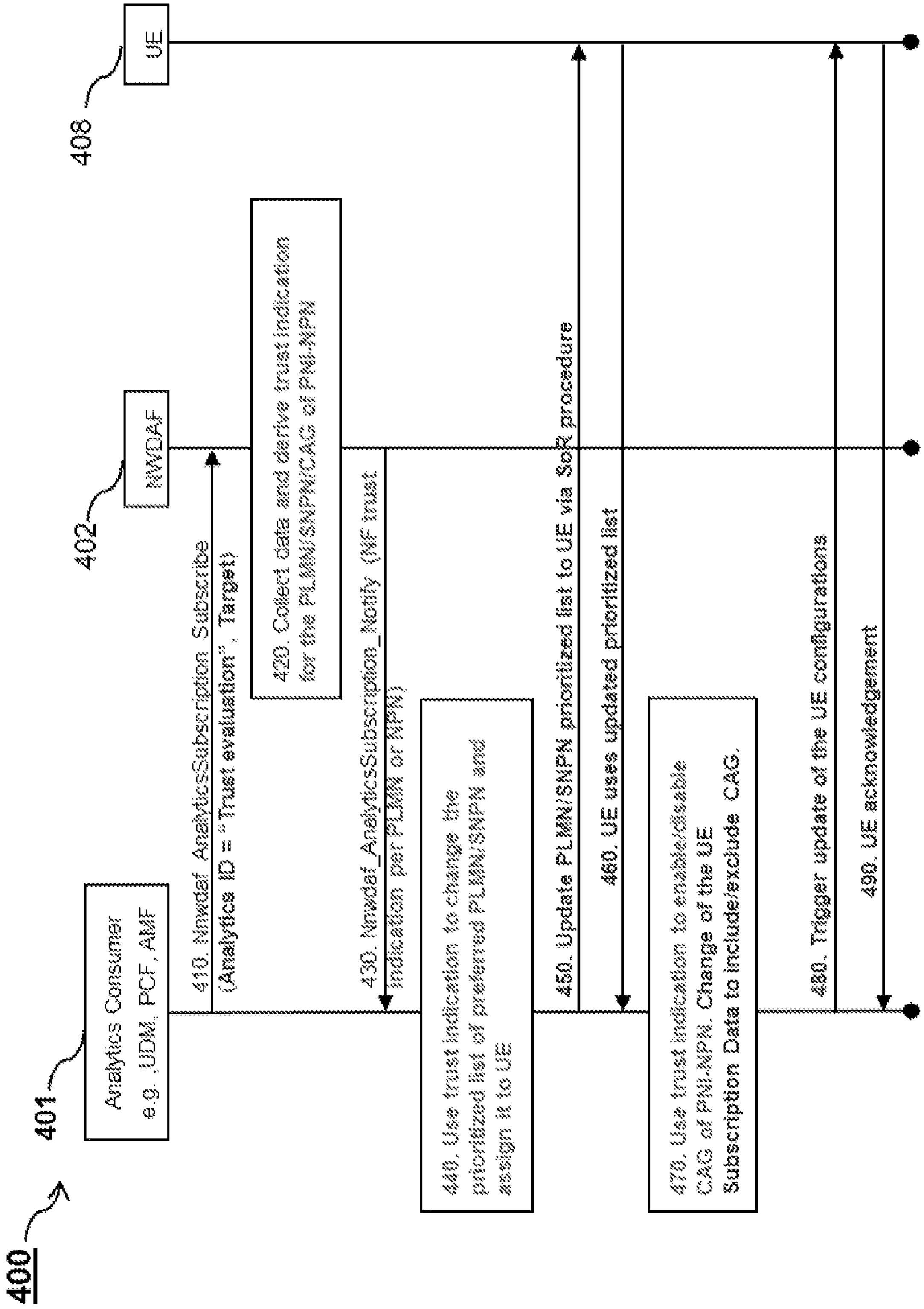
FIG. 4 illustrates another exemplary procedure for utilizing a trust indication according to embodiments of the present disclosure.

The network architecture 100 shown in FIG. 1 corresponds to FIG. 4.2.4-3 of the 3GPP TS 23.501. It depicts the 5G System roaming architecture in the case of home routed scenario with service-based interfaces within the control plane. Function entities referred in the present disclosure, e.g., SEPP, NRF, OAM, NF, AMF, UE, can be arranged as shown in FIG. 1.

Although the NWDAF and ADRF are not depicted here for simplicity reasons, they follow the same service-based principles and are described more in details (along with corresponding $N_{nwdaf}$ and $N_{adrf}$ interfaces and services) in 3GPP TS 23.288.

It is to be understood that the network architecture 100 is shown only for purpose of illustration, without suggesting any limitation to the scope of the present disclosure. Embodiments of the present disclosure may also be applied to an environment with a different structure.

Figure 2:
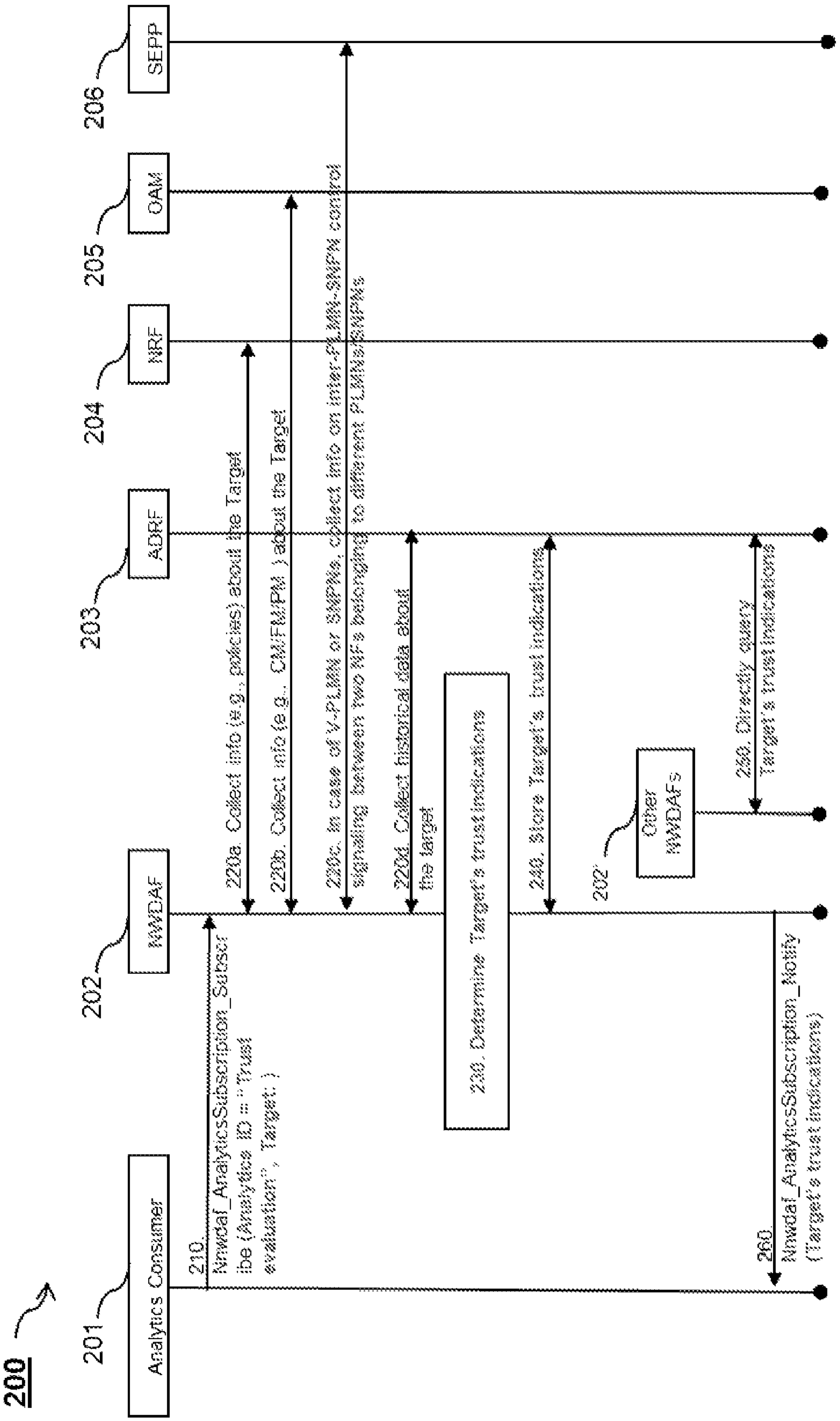
FIG. 2 illustrates an exemplary procedure for determining a trust indication according to embodiments of the present disclosure.

FIG. 2 illustrates an exemplary procedure for determining a trust indication of a given target entity (i.e., a communication point) according to embodiments of the present disclosure. As indicated above there are multiple options for implementing the proposed means for determining the trust indications envisioned in the present disclosure. FIG. 2 illustrates an exemplary procedure, with the deployment option 1 as indicated above is taken for hosting the proposed means for determining the trust indications envisioned in this disclosure. It should be understood that similar procedure is applicable to the deployment options 2 and 3 as indicated above, which can be implemented by changing the NWDAF of FIG. 2 to respective network entity hosting the means for determining the trust indications.

This exemplary procedure 200 relies on a NWDAF (e.g., as defined within 3GPP SA2 TS 23.288) capabilities for data collection and analytics derivation, and the NWDAF 202 is extended further to accommodate a derivation of trust indication as proposed in this disclosure. It should be understood that similar procedures may hold in the case of other entities capable of performing analytics derivation of trust indication, e.g., in 3GPP SA5 MDAS context (e.g., as described in 3GPP TS 28.104), which can be implemented by changing the NWDAF of FIG. 2 to a MDAS.

At step 210, an analytics consumer 201 requests a NWDAF 202 for analytics on a trust indication of a target entity (not shown in FIG. 2). The target entity may be a communication point, such as a NF, a NF set, MnF, PLMN, or NPN (e.g., SNPN, or CAG), etc. An analytics consumer is a network entity which will utilize the trust indication. For example, the analytics consumer may be an OAM entity. In other examples, the analytics consumer may be a UDM, a SEPP of a HPLMN, a SoR, a NRF, or a FL aggregator.

In some embodiments, through the request, the analytics consumer 201 may subscribe to a novel analytic type, defined by Analytics ID="Trust evaluation" for example, by providing information of the desired target entity of the analytics. For example, the analytics consumer 201 may specify an identifier of the target entity, e.g., NF instance ID, NF type, ID of a NF set, ID of a MnF, V-PLMN ID, PLMN ID+NID in the case of SNPN, or CAG ID in the case of PNI-NPN. NID is a network identifier of a SNPN. For example, the analytics consumer 201 may send a message Nnwdaf_AnalyticsSubscription_Subscribe containing an Analytics ID="Trust evaluation", and an ID of the target entity.

At steps 220*a*, 220*b*, 220*c*, 220*d* (collectively referred to as step 220), the NWDAF 202 collects data and/or information needed for performing the requested analytics. The NWDAF 202 collects the data needed for performing the requested analytics. The data sources may be different network entities, e.g., NRF, OAM, etc. For example, as shown at step 220*a*, the NWDAF 202 may collect information (e.g., policies) about the target entity from a NRF 204. As shown at step 220*b*, the NWDAF 202 may collect information (e.g., configuration management (CM), fault management (FM), performance management (PM)) about the target entity. As shown at step 220*d*, the NWDAF 202 may collect historical data about the target entity, e.g., abnormal behavior statistics, as contained in ADRF 203.

In case that the target entity is a VPLMN, the NWDAF 202 may collect information on messages exchanged between the VPLMN and other mobile networks (e.g., HPLMNs). In case that the target entity is a SNPN, the NWDAF 202 may collect information on messages exchanged between the SNPN and other mobile networks (e.g., PLMNs and/or SNPNs). For example, as shown at step 220*c*, the NWDAF 202 may collect information on inter-PLMN-SNPN control signaling between two NFs belonging to different PLMNs/SNPNs. For example, inter-PLMN-SNPN control signaling relates to parameter exchanges, capability negotiation request/response on N32 interface, e.g., information on discarded malformed N32 messages or other anomalies message mismatch such as destination address not belonging to SEPPs or PLMNs, an excessive controlling plan (CP) signaling, etc.

Then, at step 230, the NWDAF 202 performs a novel type of analytic on the trust indication, based on the collected data/information. In this regard, the NWDAF 202 may determine or derive a trust score of the target entity and further supplementary information related to the trust indication, e.g., validity period, trust fluctuation, list of NFs experiencing a same trust score, the information on the NFs interacting with the NF under evaluation with associated trusted levels, etc. The trust score is statistic or prediction. In one embodiment, the trust score may be determined or derived by further considering, in addition to data/information collected in step 220, information on exceptions, which may comprise one or more of the number of exceptions, type of exceptions, level of exceptions, and confidence of exceptions, as determined by the NWDAF 202 in an anomalous NF behavior analytics detection functionality.

At step 240, the outcome of NWDAF analytics, i.e., the trust indication of a target entity is stored in ADRF 203. The trust indication of the target entity may be retrieved by a UDM, a SoR, a SEPP, a NRF, an OAM, or any NFs, with a corresponding access right.

In some embodiments, other NWDAF (denoted as 202') can directly query the ADRF 203, in order to retrieve a trust indication of the target entity, as shown at step 250. In an example, when a NWDAF 202' receives a request for a trust indication of a target entity, the NWDAF 202' may check if the trust indication is stored in the ADRF 203. If the requested trust indication is not stored in the ADRF 203, the NWDAF 202' may start to determinate the trust indication as the NWDAF 202.

At step 260, the NWDAF 202 notifies the analytics consumer 201 about the derived trust indication of the target entity. For example, the NWDAF 202 may send to the analytics consumer 201 a message Nnwdaf_AnalyticsSubscription_Notify containing the derived trust indication of the target entity.

In some embodiments, the NWDAF 202 may update an old trust indication of the target entity with a newly derived trust indication of the target entity, e.g., periodically or based on different events (e.g., an abnormal behavior of the target entity). Accordingly, the analytics consumer 201 may performed an update of the trust indication of the target entity, e.g., in response to the received message Nnwdaf_AnalyticsSubscription_Notify.

Figure 3:
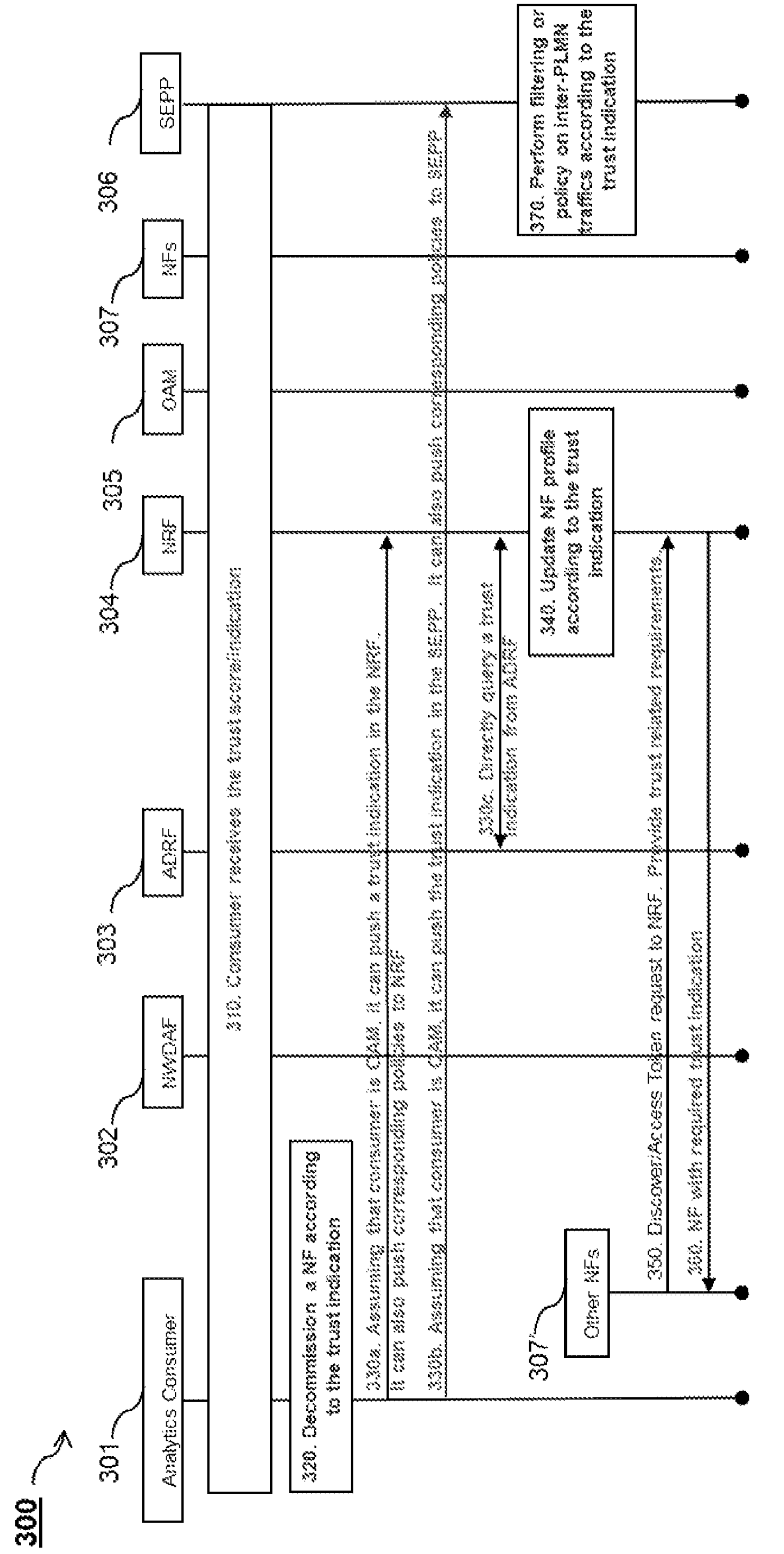
FIG. 3 illustrates an exemplary procedure for utilizing a trust indication according to embodiments of the present disclosure.

FIG. 3 shows an example procedure for utilizing a trust indication of a given target entity (i.e., a communication point) according to embodiments of the present disclosure. It illustrates a case where an OAM entity is a consumer of analytics provided by the NWDAF (with the deployment option 1 as indicated above). It should be understood that similar procedure is applicable to the deployment options 2 and 3 as indicated above, which can be implemented by changing the NWDAF of FIG. 3 to respective network entity hosting the means for determining the trust indications. Meanwhile, it should be understood that similar procedures are applicable in MDAS context, which can be implemented by changing the NWDAF of FIG. 3 to a MDAS.

At step 310, the analytics consumer 301, e.g., OAM, receives the trust score/indication with respect to a given target entity. Corresponding data collection and further procedures for determining the trust score/indication can be performed as indicates in steps 210 to 260 of FIG. 2. In an example, the trust score/indication may be received from the NWDAF 302, e.g., similar as the operation at step 260. In another example, the trust score/indication may be retrieved from the ADRF 303, e.g., similar as the ADRF 203 in FIG. 1.

At step 320, assuming the analytics consumer 301 is an OAM entity, the OAM entity may use a trust indication of a given NF or MnF and/or a trust indication of a PLMN/NPN to which the given NF belongs, for management of the NF or MnF. In an example, if a trust score of the NF or a trust score of a PLMN to which a NF belongs falls under a certain threshold, the OAM entity may decide to decommission the NF. For example, the NF may be suspended until its trust value is restored to an appropriate level.

The analytics consumer 301 may push the trust score/indication to other network entities, for utilizing the trust score/indication to perform network operations related to the target entity. In an embodiment, assuming the analytics consumer 301 is an OAM entity, the OAM may push the trust indication of a given NF and/or a trust indication of a PLMN/NPN to which the given NF belongs to a NRF 304, so that a profile of the NF can be updated and maintained accordingly at the NRF 304 (as shown at step 340). For example, the NRF 304 may increase or decrease a priority of a discovery response for the given NF based on a trust indication of a PLMN/NPN to which the given NF belongs.

In another embodiment, the NRF 304 may also directly query the ADRF 303 regarding the trust indication (e.g., including a trust score of the given NF and/or a trust score of a PLMN/NPN to which the given NF belongs) as shown at step 330*b*, e.g., in order to update the NF profile accordingly. In another embodiment, the NRF 304 may also directly query the NWDAF 302 regarding the trust indication. In this sense, the NRF 304 is an analytics consumer.

In some embodiments, assuming the analytics consumer 301 is an OAM entity, the OAM may also push a policy corresponding to the trust score/indication to the NRF 304, for example, in an case that to the NRF 304 is a home NRF of the given NF. Then the home NRF can apply that policy for discovery and access token requests, thus accordingly restricting or allowing services to NF/MnF/PLMNs. For example, when the local/home NRF is contacted for a discovery of a NF from other PLMN, the local NRF can match a trust score of the NF with requirements of the consumer NF, e.g., filtering out the NFs with a lower trust score. In this example, a policy of the discovery based on trust indications may be received in step 330*a*. More details about the discovery would be found latter with respect to steps 350 and 360.

In some embodiments, assuming the analytics consumer 301 is an OAM entity, the OAM may push a trust score/indication and/or a corresponding policy to a SEPP 306 as shown at step 330*b*, so as to allow or restrict traffic to NFs/PLMNs/SNPNs. In an embodiment, the OAM may push a trust indication of a given NF and/or a trust indication of a PLMN/NPN to which the given NF belongs to the SEPP 306. In another embodiment, the SEPP 306 may also directly query the ADRF 303 regarding the trust indication. In another embodiment, the SEPP 306 may also directly query the NWDAF 302 regarding the trust indication. In this sense, the SEPP 306 is an analytics consumer.

Based on such trust indication and corresponding policy, the SEPP 306 can provide additional filtering on traffics coming from NFs of different PLMNs, as shown at step 370. For example, if a certain PLMN NF (e.g., AMF) is not behaving correctly, then the SEPP 306 can block traffic coming from that NFs of the PLMN. In an example, if the trust score of the PLMN to which the given NF belongs is low (i.e., lower than a predefined threshold), then a policy for blocking traffic from that NF can be determined based on the low trust score.

An embodiment for utilizing a trust indication in NF discovery is further described with reference to steps 350 and 360, in which a consumer NF may request a discovery of a specific NF. As shown at step 350, the consumer NF 307' sends a discovery request or an access token request to a NRF 304. In such request, the consumer NF 307' may provide trust related requirements, e.g., which trust score needs to be satisfied by the discovered NF. Then, the discovery of NF can be done based on trust indications of NFs and associated PLMNs/NPNs maintained in the NRF 304. The discovery of NF can be done, and suitable NFs can be selected based on related policies configured by an OAM, as shown at step 360. Optionally, if the required trust indications are expressed by the NF 307' during discovery, the NRF 304 may provide a NF matching such requirements with its trust indication. Two example scenarios for such NF discovery are described below.

Same PLMN scenario: the NF discovery is performed within a same PLMN. In an example, a network exposure function NEF1 (e.g., NF 307) is not behaving correctly (e.g., malicious behavior) which is detected by NWDAF 302, and according trust indication is derived. The NWDAF 302 provides the derived trust indication, e.g., the trust score of this NEF1 to the NRF 304. Once any other NF (e.g., the consumer NF 307') tries to discover network exposure functions (NEFs) from the NRF 304, the NRF 304 can lower a priority of the NEF1 based on its trust score while discovering the NEF1. Based on the current trust indication as well as the requirements (if available during the discovery request), corresponding NEFs with higher trust scores can be discovered. For example, for a gaming service, a NEF with lower trust score might still meet the requirements, whereas for a mission critical service only the highest trust score may be required in order to select a most trustworthy NEF.

Inter PLMN scenarios: the NF discovery is performed across different PLMNs. In an example, a given NF in first PLMN is not behaving correctly (e.g., malicious behavior), which is detected by NWDAF (e.g., NWDAF 302), and according trust indication is derived. The NWDAF 302 provides the derived trust indication, e.g., a trust score of this NF (and/or a trust score of the first PLMN) to a local/home NRF (NRF 304) belonging to a second PLMN, e.g., where NWDAF 302 is deployed. Once any NF in the second PLMN tries to discover the same NF type as the given NF from the NRF 304, then NRF 304 can lower the priority of the given NF or filter the given NF based on the trust score of this NF and/or the trust score of the first PLMN, while discovering this NF.

FIG. 4 shows exemplary procedures for utilizing a trust indication of a given target entity (i.e., a communication point) according to embodiments of the present disclosure. It illustrates the case where UDM may be a consumer of analytics provided by the NWDAF (with the deployment option 1 as indicated above). It should be understood that similar procedure is applicable to the deployment options 2 and 3 as indicated above, which can be implemented by changing the NWDAF of FIG. 4 to respective network entity hosting the means for determining the trust indications. Meanwhile, it should be understood that similar procedures are applicable in MDAS context, which can be implemented by changing the NWDAF of FIG. 4 to a MDAS.

At step 410, an analytics consumer 401, e.g., UDM entity, may subscribe to a novel analytic type, defined by Analytics ID="Trust evaluation" as explained previously with reference to step 210 of FIG. 2. In this procedure 400, a trust indication of a mobile network is to be evaluated. The trust indication may be of a PLMN level trust or a NPN level trust. The target entity may be a PLMN, a SNPN, or a CAG of PNI-NPN.

At step 420, similar to procedures as described for FIG. 2 and FIG. 3, the NWDAF 402 collects the data/information needed for performing the requested analytics, and determines a trust score and further information belonging to the trust indication for a target PLMN, a target SNPN or a target CAG ID in the case of PNI-NPN.

At step 430, similar to procedures as described for FIG. 2 and FIG. 3, the NWDAF 402 notifies the analytics consumer 401, e.g., UDM, about the derived trust indication of the target entity.

In some embodiments, at step 440, the UDM may use the received trust indication to change a prioritized list of preferred PLMNs or SNPNs, and assign those to UEs. For example, a PLMN with a lower trust score may be removed from the prioritized list of preferred PLMNs.

Alternatively, a SoR AF can collect these analytics and prepare the SoR data accordingly. In an embodiment, the SoR AF can request the trust indication of a PLMN or SNPN and receive the trust indication from the NWDAF 402, in a similar way as steps 410 and 430. Then the SoR AF can prepare SoR data related to the PLMN or SNPN based on the trust indication of the PLMN or SNPN. For example, a PLMN with a lower trust score may be moved lower in the prioritized list of preferred PLMNs.

Here is an exemplary scenario for this embodiment. There are three mobile network operators or three PLMNs in Canada. A mobile network operator in Germany where this embodiment is deployed, may keep on collecting data from the three PLMNs of Canada via one or more SEPP. Then, a trust score per PLMN may be determined and assigned to each PLMN/operator of the three PLMNs/operators in Canada. When a German operator's user is roaming in Canada, then the German operator can adjust a PLMN priority list in a UE of the user (via a SoR) based on trust scores assigned to the three PLMNs of Canada, so that the UE can be attached by default to a PLMN of the three PLMNs with a higher trust score.

The updates in the prioritized list of preferred PLMNs or SNPNs may serve as a trigger to update UE configurations accordingly, as shown at step 450. For example, as defined in 3GPP TS 23.501 for an SNPN-enabled UE with PLMN subscription, a credentials holder controlled prioritized lists of preferred SNPNs may be updated by the credentials holder using a SoR procedure, e.g., as defined in Annex C of 3GPP TS 23.122. Thus, the UDM uses the SoR procedure to make the updates. Similarly, the preferred PLMNs can be updated at UEs. In an example, a prioritized list of PLMN IDs is provided via mobility restriction list from an access and mobility management function (AMF), and the AMF may update the list using UE Configuration Update procedure, e.g., as described in section 4.2.4 of 3GPP TS 23.502. UE may acknowledge the received update, as shown at step 460.

In some embodiments, at step 470, the UDM 401 may use the received trust indication of a CAG to enable or disable the CAG of PNI-NPN. For example, the UDM 401 may change a UE Subscription Data in the UDM 401 to include or exclude a CAG ID of the CAG based on its trust indication.

The changes of UE subscription data can trigger an update of the UE configurations, e.g., as described in clause 5.15.5.2.2 of 3GPP TS 23.501. This can be executed either by AMF or PCF, e.g., as described in a UE configuration update procedure of section 4.2.4 of 3GPP TS 23.502. UE may acknowledge the received update, as shown at step 480.

Figure 5:
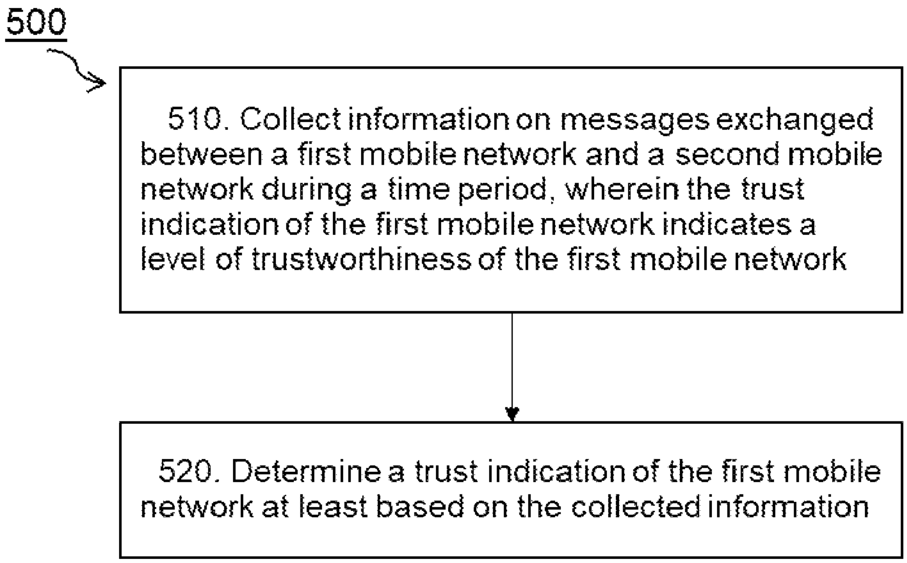
FIG. 5 is a flow chart depicting a method according to an embodiment of the present disclosure.

More details of the example embodiments in accordance with the present disclosure will be described with reference to FIGS. 5, 6, 7*a* and 7*b*. FIG. 5 illustrates a flowchart of a method 500 according to an embodiment of the present disclosure. The method 500 can be implemented at any suitable device. For example, the method 500 can be implemented at a first apparatus, which is configured to be hosted in NWDAFs illustrated in FIGS. 2, 3, and 4. In other examples, the first apparatus may be hosted in other network analytics function entity (such as MDAS), or in a separate network security entity, or in any suitable network function entity.

As shown at block 510, a method 500 comprises collecting information on messages exchanged between a first mobile network and a second mobile network during a time period. At block 520, the method 500 comprises determining a trust indication of the first mobile network at least based on the collected information. The trust indication of the first mobile network indicates a level of trustworthiness of the first mobile network. The first mobile network may be a PLMN or an NPN (including a SNPN and a CAG of PNI-NPN). In an exemplary scenario, a NWDAF in the second mobile network (e.g., PLMN2) may perform the information collection and the determination of the trust indication for a first mobile network (e.g., PLMN1), so as to e.g., protect PLMN2 or network entities from insecurity from PLMN1.

In some embodiments, the collected information on message exchanges may comprise information on at least one of: an inter-network control signaling communicated between a first network function belonging to the first mobile network and a second network function belonging to the second mobile network, and a key performance indicator associated with failures in the first network.

In some embodiments, the trust indication may comprise a trust score, which indicates a trust metric of the first mobile network. The trust indication may further comprise at least one of: the time period, a validity period of the trust indication, and information on fluctuation of the trust score over the time period.

The time period may be a considered variable time period in the past. In some embodiments, the collection of information and the determination of the trust indication may be performed periodically. Then, the time period may be a cycle of the periodical determining of the trust indication. In some embodiments, the method 500 may further comprise updating a trust indication of the first mobile network with the determined trust indication. The update may be trigged based on different events, e.g., an abnormal behavior of the first mobile network. Alternatively, the update may be performed periodically, e.g., in a cycle same as the time period. The determined trust indication may be provided to a network entity, e.g., a SEPP, a UDM entity, a SoR entity, a NRF entity, an OAM entity, or a FL aggregator.

In some embodiments, the collection of information and the determination of the trust indication may be performed on-demand dynamically. The time period may be a variable time period, which may be set on-demand. In these embodiments, the method 500 may further comprise receiving from a network entity, a request for the trust indication of the first mobile network; in response to the request, determining the trust indication of the first mobile network. The method 500 may further comprise providing the determined trust indication to the network entity in response to the request, or other request, or other trigger events (e.g., an abnormal behavior of the first mobile network). The network entity may be called as an analytics consumer, such as those shown in FIGS. 2, 3, and 4. For example, the network entity may be any of a SEPP, a UDM entity, a SoR entity, a NRF, an OAM entity, a FL aggregator. In an example, the request may comprise an identifier of the network entity. In an example, the request may indicate the time period.

In some embodiments, the method 500 may further comprise storing the trust indication in a database. For example, the database may an ADRF as shown in FIGS. 2, 3 and 4. Then, the database may store trust indications of a plurality of mobile networks.

In some embodiments, the determining of the trust indication may comprise analyzing exceptions related to the first network occurred in the time period; and the trust indication is determined further based on information of the exceptions. The information on the exceptions may include an exception category, an exception level, a frequency of exceptions happened during a considered period of time (e.g., the above said time period) in the past.

In some embodiments, the method 500 may further comprise obtaining the trust indication of the first mobile network from a database. In this regard, the trust indication of the first mobile network may have been determined by other means and stored in the database, e.g., ADRF.

Figure 6:
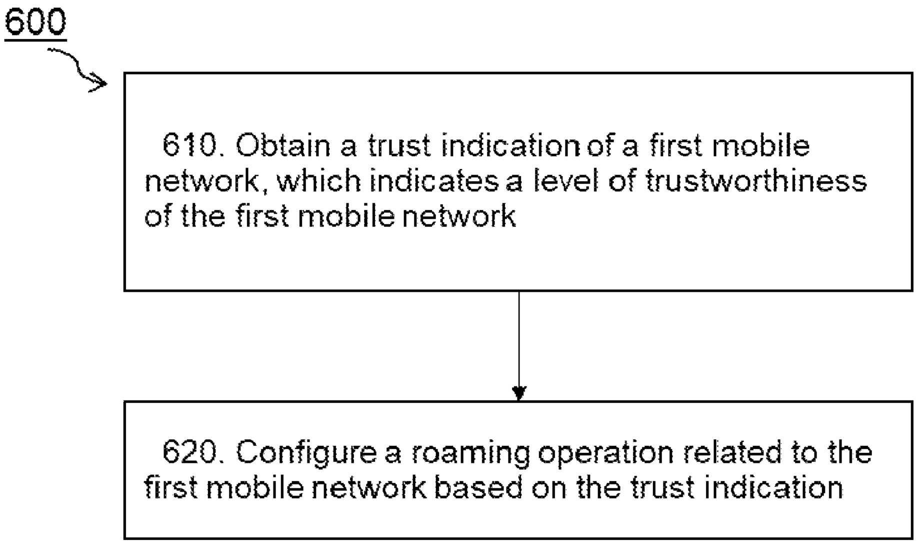
FIG. 6 is a flow chart depicting a method according to an embodiment of the present disclosure.

FIG. 6 is a flow chart depicting a method 600 according to an embodiment of the present disclosure. The method 600 can be implemented at any suitable device. For example, the method 600 can be implemented at a second apparatus, which is configured to be implemented at any suitable network function entity, such as the analytics consumer (e.g., SEPP, UDM, SoR, PCF, AMF, etc.) as shown in FIGS. 2, 3, and 4.

As shown at block 610, the method 600 comprises obtaining a trust indication of a first mobile network, which indicates a level of trustworthiness of the first mobile network. At block 620, the method 600 comprises configuring a roaming operation related to the first mobile network based on the trust indication. In an exemplary scenario, a UDM/SoR in the second mobile network (e.g., PLMN2) may obtain the trust indication of the first network (e.g., PLMN1) from a NWDAF in the second mobile network (e.g., PLMN2). The PLMN2 may be a home mobile network of user equipment, while the PLMN1 may be a candidate visited mobile network.

In some embodiments, the trust indication of the first mobile network may be received from a network entity for determining the trust indication, e.g., a NWDAF. In other embodiments, the trust indication of the first mobile network may be retrieved from a database, e.g., ADRF.

In some embodiments, configuring the roaming may comprise configuring a prioritized list of preferred mobile networks for roaming based on the trust indication. Alternatively, or additionally, configuring the roaming may comprise selecting the first mobile network as a visited mobile network based on the trust indication. In some embodiments, if the trust indication indicates that the first mobile network is trustworthy, the first mobile network (e.g., its identifier) may be added into the prioritized list of preferred mobile networks for roaming. If the trust indication indicates that the first mobile network is not trustworthy, the first mobile network (e.g., its identifier) may be removed from the prioritized list of preferred mobile networks for roaming. A rank of the first mobile network in the prioritized list of preferred mobile networks for roaming may be adjusted based on the trust indication.

In some embodiments, the trust indication of the first mobile network may indicate a level of trustworthiness of a CAG of the first mobile network. The first mobile network may be a PNI-NPN. Then, configuring the roaming may comprise enabling the CAG if the trust indication indicates that the first mobile network is trustworthy; and/or disabling the CAG if the trust indication indicates that the first mobile network is not trustworthy.

The criteria for determining whether the first mobile network is trustworthy or not based on trust indications, may be predefined. For example, a threshold of trust score can be pre-set. If the trust score of the first mobile network is higher than the threshold, it can be determined that the first mobile network is trustworthy. Otherwise, it can be determined that the first mobile network is not trustworthy.

In some embodiments, the method 600 may further comprise triggering an update of a user equipment configuration related to roaming, in response to the roaming operation related to the first mobile network being configured. For example, a UE configuration of preferred PLMNs may be updated for a UE.

The various aspects of the present disclosure are not, however, restricted to the system that is given as an example, but a person skilled in the art may apply the solution to other communication systems.

Figure 7A:
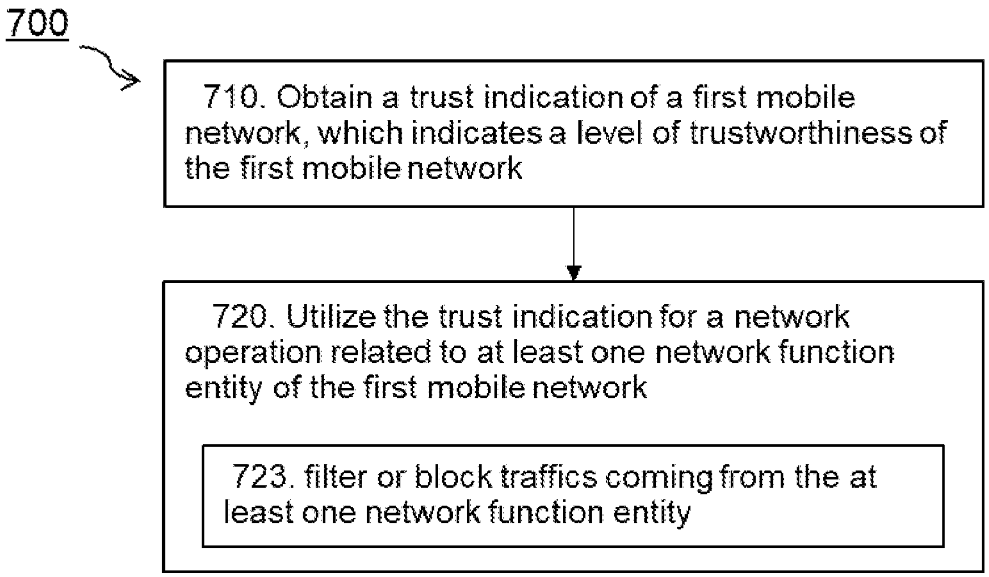
FIGS. 7*a* and 7*b* are flow charts depicting methods according to an embodiment of the present disclosure.

FIG. 7*a* is a flow chart depicting a method 700 according to an embodiment of the present disclosure. The method 700 can be implemented at any suitable device. For example, the method 700 can be implemented at a third apparatus, which is configured to be implemented at any suitable network function entity, such as the analytics consumer (e.g., SEPP) as shown in FIGS. 2, 3, and 4.

As shown at block 710, the method 700 comprises obtaining a trust indication of a first mobile network, which indicates a level of trustworthiness of the first mobile network. At block 720, the method 700 further comprises utilizing the trust indication of the first mobile network for a network operation related to at least one network function entity of the first mobile network. In an exemplary scenario, a SEPP in the second mobile network (e.g., PLMN2) may obtain the trust indication of the first network (e.g., PLMN1) from a NWDAF in the second mobile network (e.g., PLMN2), and then utilize the trust indication to protect PLMN2 or their network entities from insecurity from a network function entity of the first mobile network.

In some embodiments, as shown at block 723, a utilization of the trust indication may comprise filtering or blocking traffics coming from the at least one network function entity, in a case that the trust indication indicates a lower level of trustworthiness of the first mobile network.

Figure 7B:
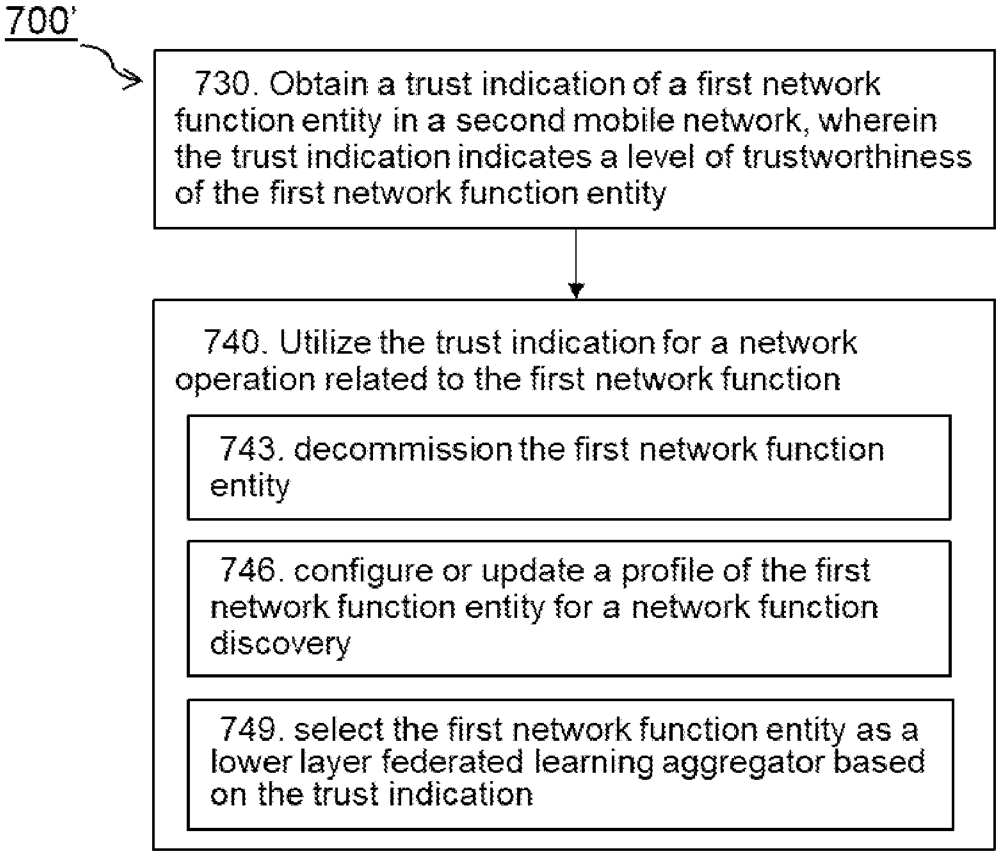

FIG. 7*b* is a flow chart depicting a method 700' according to an embodiment of the present disclosure. The method 700' can be implemented at any suitable device. For example, the method 700' can be implemented at a third apparatus, which is configured to be implemented at any suitable network function entity, such as the analytics consumer (e.g., OAM, NRF, NF, MnF, AF, etc.) as shown in FIGS. 2, 3, and 4.

As shown at block 730, the method 700' comprises obtaining a trust indication of a first network function entity in a second mobile network, wherein the trust indication indicates a level of trustworthiness of the first network function. At block 740, the method 700' further comprises utilizing the trust indication for a network operation related to the first network function entity. In an exemplary scenario, a NRF in the second mobile network (e.g., PLMN2) may obtain the trust indication of the first network function entity (e.g., NF1) of PLMN2 from a NWDAF in the same PLMN2, and then utilize the trust indication of NF1 to protect network entities of PLMN2 or other mobile networks from insecurity from NF1.

In some embodiments, as shown at block 743, a utilization of the trust indication may comprise decommissioning the first network function entity, in a case that the trust indication indicates a lower level of trustworthiness of the first network function entity. The decommissioning may be executed in an OAM entity in the second mobile network.

In some embodiments, the method 700' may further comprise sending the trust indication of the first network function entity, and/or a policy corresponding to the trust indication, to a network entity, so that the network entity is enabled to control or manage a network operation related to the first network function entity. The trust indication and the policy may be sent together or separately.

In some embodiments, as shown at block 746, a utilization of the trust indication may comprise configuring or updating a profile of the first network function entity for a network function discovery, based on the trust indication. The profile may be configured or updated at an NRF, e.g., NRF 304 shown in FIG. 3.

In some embodiments, the method 700' may further comprise receiving a discovery request or an access token request from another network function entity; and selecting the first network function entity to respond to the request, based on the trust indication. The method 700' may further comprise determining based on the trust indication, a priority of the first network function entity for a network function discovery. The first network function entity may be selected to respond to the request based on the priority. The request may indicate a requirement related to the trust indication. The selection may be made further based on the requirement.

In some embodiments, as shown at block 749, a utilization of the trust indication may comprise selecting the at least one network function entity as a lower layer federated learning aggregator based on the trust indication.

Figure 8:
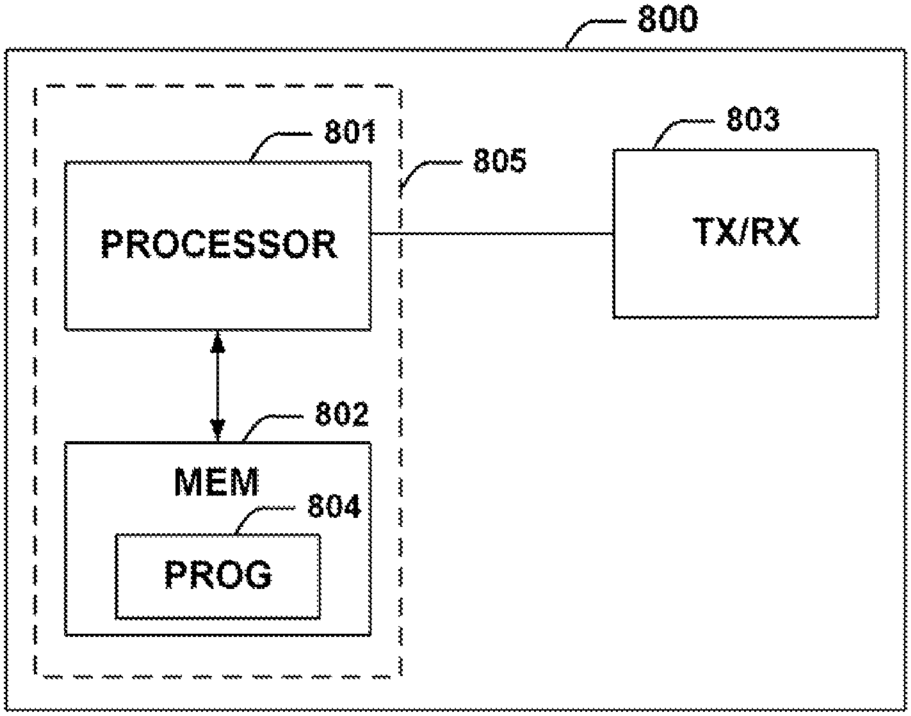
FIG. 8 shows a simplified block diagram of an apparatus according to an embodiment of the present disclosure.

Now reference is made to FIG. 8 illustrating a simplified block diagram of an apparatus 700 that may be embodied in/as a network entity (such as NWDAF, OAM, SEPP, SoR, UDM, shown in FIGS. 2, 3 and 4). The apparatus 800 may comprise at least one processor 801, such as a data processor (DP) and at least one memory (MEM) 802 coupled to the at least one processor 801. The apparatus 800 may further comprise one or more transmitters TX, one or more receivers RX 803, or one or more transceivers coupled to the one or more processors 801 to communicate wirelessly and/or through wireline.

Although not shown, the apparatus 800 may have at least one communication interface, for example, the communicate interface can be at least one antenna, or transceiver as shown in the FIG. 8. The communication interface may represent any interface that is necessary for communication with other network entities.

The processors 801 may be of any type suitable to the local technical environment, and may include one or more of the following: general purpose computers, special purpose computers, microprocessors, digital signal processors (DSPs) and processors based on multicore processor architecture, as non-limiting examples.

The MEMs 802 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The MEM 802 stores a program (PROG) 804. The PROG 804 may include instructions that, when executed on the associated processor 801, enable the apparatus 800 to operate in accordance with the embodiments of the present disclosure, for example to perform one of the methods 500, 600 and 700. A combination of the at least one processor 801 and the at least one MEM 802 may form processing circuitry or means 805 adapted to implement various embodiments of the present disclosure.

Various embodiments of the present disclosure may be implemented by computer program executable by one or more of the processors 801, software, firmware, hardware or in a combination thereof.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. It is also possible that network entity operations will be distributed among a plurality of servers, nodes or hosts. It should also be understood that the distribution of labor between different network entities may differ from that of the 5G network.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosures may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium, for example, non-transitory computer readable medium, such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. An apparatus for trust security in mobile networks, the apparatus being a network data analytics function (NWDAF) deployed in a second mobile network, the apparatus comprising:

at least one processor; and at least one memory storing instructions that, when executed by the at least one processor, cause the apparatus at least to:

receive, from an analytics consumer, a Nnwdaf_AnalyticsSubscription_Subscribe message comprising an Analytics ID identifying trust evaluation and an identifier of a first mobile network, wherein the first mobile network is a visited public land mobile network (VPLMN) or a standalone non-public network (SNPN);

collect information on messages exchanged between the first mobile network and the second mobile network during a considered variable time period in the past, wherein collecting the information comprises collecting, from a security edge protection proxy (SEPP) information on inter-PLMN-SNPN control signaling communicated on an N32 interface between a first network function belonging to the first mobile network and a second network function belonging to the second mobile network, the information on the inter-PLMN-SNPN control signaling comprising information on: parameter exchanges, capability negotiation request and response signaling, discarded malformed N32 messages, a destination address not belonging to SEPPs or PLMNs, and excessive control plane signaling;

collect, from an analytics data repository function, ADRF, historical abnormal-behavior statistics associated with the first mobile network;

analyze exceptions related to the first mobile network that occurred during the considered variable time period, wherein the exceptions comprise abnormal events and the analyzing produces exception information comprising an exception category, an exception level, and a frequency of the exceptions;

determine a trust indication of the first mobile network at least based on the collected information on the inter-PLMN-SNPN control signaling, the historical abnormal-behavior statistics, and the exception information, wherein the trust indication of the first mobile network indicates a longer-term level of trustworthiness of the first mobile network rather than an instantaneous abnormal-behavior notification, wherein the trust indication comprises a trust score for the first mobile network, the considered variable time period, a validity period of the trust score, and fluctuation information indicating changes or trends in the trust score over the considered variable time period;

store the trust indication in the ADRF; and transmit, to the analytics consumer, a Nnwdaf_Analytics-Subscription_Notify message comprising the trust indication of the first mobile network.

2. The apparatus of claim 1, wherein the analytics consumer comprises one of:

a security edge protection proxy, SEPP;

a unified data management, UDM, entity;

a steering of roaming, SoR, application function;

a network repository function, NRF, entity;

an operation, administration and management, OAM, entity; or a federated learning aggregator.

3. The apparatus of claim 2, wherein the identifier of the first mobile network comprises a V-PLMN ID when the first mobile network is the VPLMN, and comprises a PLMN ID and a network identifier, NID, when the first mobile network is the SNPN.

4. The apparatus of claim 3, wherein the Nnwdaf_AnalyticsSubscription_Subscribe message further comprises information indicating the considered variable time period in the past for which the information on the inter-PLMN-SNPN control signaling is to be collected.

5. The apparatus of claim 4, wherein the information on the inter-PLMN-SNPN control signaling comprises information indicating a message mismatch in which a destination address of an N32 message does not belong to a SEPP or a PLMN associated with the inter-PLMN-SNPN control signaling.

6. The apparatus of claim 5, wherein the information on the inter-PLMN-SNPN control signaling comprises information indicating discarded malformed N32 messages exchanged between the first network function and the second network function.

7. The apparatus of claim 6, wherein the historical abnormal-behavior statistics comprise at least one of a number of call failures, a number of call drops, a number of errors, a number of attack events, or a number of abnormal events associated with the first mobile network.

8. The apparatus of claim 7, wherein determining the trust indication comprises weighting the exception information based on a confidence of the exceptions determined by an anomalous network-function-behavior analytics detection functionality of the NWDAF.

9. The apparatus of claim 8, wherein the trust score is a scalar value within a range of 0 to 100 and is classified as one of low confidence, medium confidence, or high confidence.

10. The apparatus of claim 9, wherein the apparatus is further caused to update, in the ADRF, a previously stored trust indication of the first mobile network with the determined trust indication periodically or in response to detecting an abnormal behavior associated with the first mobile network.

* * * * *